(12) United States Patent
Auer et al.

(10) Patent No.: US 8,203,317 B2
(45) Date of Patent: Jun. 19, 2012

(54) CONTROL PARAMETER ADAPTATION DEPENDENT ON ROTATIONAL SPEED

(75) Inventors: Frank Auer, Roehrmoos (DE); Harald Panhofer, Graz (AT); Pierre Lefaix, Graz (AT)

(73) Assignee: Infineon Technologies AG, Neubiberg (DE)

( * ) Notice: Subject to any disclaimer, the term of this patent is extended or adjusted under 35 U.S.C. 154(b) by 386 days.

(21) Appl. No.: 12/409,991

(22) Filed: Mar. 24, 2009

(65) Prior Publication Data
US 2010/0244787 A1    Sep. 30, 2010

(51) Int. Cl.
*H02H 7/06* (2006.01)
(52) U.S. Cl. .................................... 322/28; 322/29
(58) Field of Classification Search ............ 322/28, 322/29
See application file for complete search history.

(56) References Cited

U.S. PATENT DOCUMENTS

| | | | |
|---|---|---|---|
| 5,497,071 A * | 3/1996 | Iwatani et al. | 322/28 |
| 7,170,255 B2 * | 1/2007 | Hofmann et al. | 318/400.02 |
| 7,245,102 B1 * | 7/2007 | Spong et al. | 318/632 |
| 7,439,715 B2 * | 10/2008 | Rozman et al. | 322/45 |

* cited by examiner

*Primary Examiner* — Tulsidas C Patel
*Assistant Examiner* — Iraj A Mohandesi
(74) *Attorney, Agent, or Firm* — Slater & Matsil, L.L.P.

(57) ABSTRACT

A method for controlling an output voltage of generator arrangement includes generating a controlled field current for a field winding dependent on the output voltage and dependent on at least one control parameter that depends on a rotational speed of the generator. The method also includes decreasing a rate of change of the controlled field current with respect to an output voltage change if the rotational speed decrease.

23 Claims, 4 Drawing Sheets

CONTROL PARAMETER ADAPTATION DEPENDENT ON ROTATIONAL SPEED

TECHNICAL FIELD

The present disclosure relates to a method and a circuit arrangement for controlling the output voltage of a three-phase-current generator arrangement that includes a three-phase-generator having a field winding.

BACKGROUND

Three-phase-current generators are, for example, used in vehicles where they serve to charge a vehicle battery that supplies electrical loads in the vehicle. In a vehicle, such a generator is driven by the vehicle engine. Generators that are used to charge a vehicle battery are also known as alternators.

The output power provided by a generator is dependent on the load of the generator, i.e., it is dependent on the current consumption of a load connected to the generator, and is furthermore dependent on the rotational speed at which the generator is driven. Since both of these influencing variables may vary, the output power of a generator is controllable. The output power may be controlled by controlling a current flowing through the field winding of the generator.

SUMMARY OF THE INVENTION

One aspect of the present disclosure relates to a method for controlling the output voltage of a generator arrangement that includes a generator having a field winding. The method includes generating a controlled field current (exciting current) for the field winding dependent on an output voltage and dependent on a rotational speed of the generator.

A further aspect relates to a circuit arrangement for controlling the output voltage of a generator arrangement that includes a generator having a field winding. This circuit arrangement includes a first input for providing an output voltage signal that is dependent on an output voltage and a second input for providing a rotational speed signal that is dependent on a rotational speed of the generator. The circuit arrangement is adapted to generate a controlled field current for the field winding, the field current being dependent on the output voltage and being dependent on the rotational speed of the generator.

A further aspect relates to a supply voltage arrangement that includes a generator arrangement having a generator that includes a field winding, and having output terminals for providing an output voltage. A rotational speed detection unit is adapted to detect a rotational speed of the generator and to provide a rotational speed signal that is dependent on the rotational speed. A circuit arrangement generates a field current for the field winding. The circuit arrangement receives an output voltage signal that is dependent on the output voltage and the rotational speed signal, and is adapted to generate a controlled field current for the field winding, the field current being dependent on the output voltage and on the rotational speed of the generator.

BRIEF DESCRIPTION OF THE DRAWINGS

Examples will now be explained in detail with reference to the drawings. These drawings serve to explain the basic principle. Therefore, only features necessary for understanding the basic principle are disclosed. The drawings are schematic drawings and, therefore, are not to scale. In the drawings, unless stated otherwise, same reference characters designate the same features with the same meaning.

DETAILED DESCRIPTION OF ILLUSTRATIVE EMBODIMENTS

Figure 1:
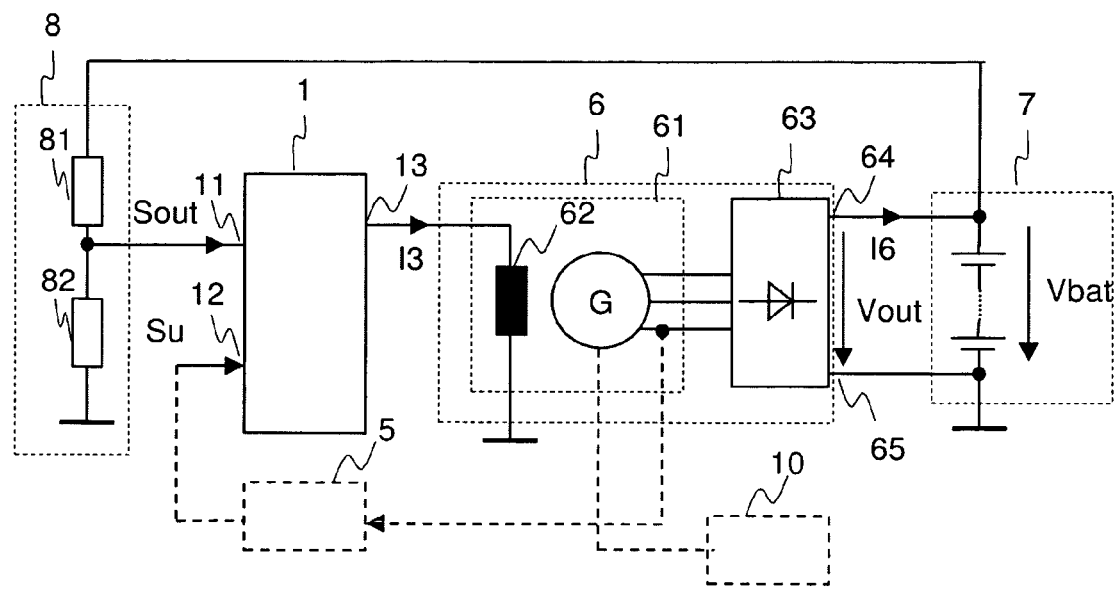
FIG. 1 illustrates a system having a generator arrangement that includes a generator with a field winding, and having a circuit arrangement for controlling an output voltage of the generator arrangement.

FIG. 1 shows an overview of an example of a voltage supply arrangement. This voltage supply arrangement includes a generator arrangement 6 having a generator 61 that includes a field winding 62, and having a rectifier arrangement 63 connected to the generator 61. In the present example the generator 61 is a three-phase-current generator. It should be noted that this is only an example. The explanation given below in an equivalent manner also applies to any other generator, like for example a single-phase-generator. The rectifier arrangement 63 connected to the generator 61 serves to convert the alternating voltage provided by the generator 61 into a rectified output voltage Vout of the generator arrangement 6. This rectifier arrangement 63 may be a conventional diode rectifier or any other rectifier.

The voltage supply arrangement serves to provide a supply voltage to a load that may be connected to output terminals 64, 65 of the generator arrangement 6. The load, for example, includes a rechargeable battery (accumulator) 7 to which electrical loads (not shown) may be connected. The voltage supply arrangement in this case serves to charge the battery 7, which in turn serves to provide supply voltages or supply currents to the electrical loads connected to the battery 7.

Such an overall system including a voltage supply arrangement and a rechargeable battery connected to the supply voltage arrangement is, for example, used in vehicles. However, such a system may be applied in any field in which an electrical generator for charging a rechargeable battery is used. Generator 61 is, for example, driven by a drive arrangement 10, that for the sake of a better understanding is also illustrated (in dashed lines) in FIG. 1. In the voltage supply arrangement of a vehicle this drive arrangement, for example, includes the combustion engine of the vehicle. Basically, generator 61 may be driven in any suitable manner, i.e., also by a turbine that is driven through wind, water or vapor pressure.

The output voltage of the current generator 61, and therefore the output voltage of the generator arrangement 6, is dependent on the rotational speed of the generator, and is also dependent on the load of the generator, i.e., is dependent on the current consumption of the load connected to the generator arrangement. Since both influencing parameters may vary, it is desired to control the output voltage Vout.

For controlling the output voltage Vout the voltage supply arrangement of FIG. 1 includes a circuit arrangement that provides a controlled field current I3 for field winding 62 of the generator arrangement 6. In this connection one takes advantage of the fact that via the current flowing through the field winding the magnetic field within the generator 61 may be controlled, and therefore, the output power of the generator 61 may be controlled.

Circuit arrangement 1 is adapted to generate field current I3 dependent on the output voltage Vout. For this purpose circuit arrangement 1 is provided with an output voltage signal Sout at a first input, output voltage signal Sout being dependent on the output voltage Vout and, for example, is proportional to the output voltage Vout. Output voltage signal Sout may be generated by a voltage divider 8 having voltage divider resistances 81, 82 across which the output voltage Vout is present. Basically output voltage Vout may directly be provided (not shown) to the circuit arrangement 1, if the circuit components of circuit arrangement 1 have a sufficient voltage blocking capability; in this case output voltage signal Sout corresponds to output voltage Vout.

Figure 2:
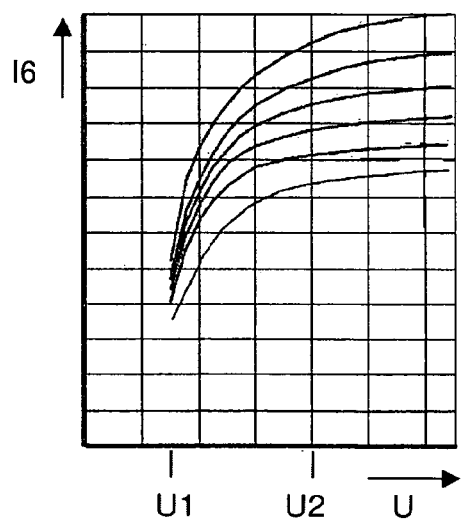
FIG. 2 illustrates basically the dependency of an output current of a generator on the rotational speed of the generator for different generator types.

Besides the output voltage Vout the output current of the generator 61 is also dependent on the rotational speed. FIG. 2 illustrates for different generator types the dependency of the output current on the rotational speed. In FIG. 2 mean values or maximum values of rectified output currents, i.e., of currents that correspond to output current I6 of the generator arrangement 6 according to FIG. 1, are illustrated for different generator types. As can be seen from FIG. 1, the output current is strongly dependent on the rotational speed for rotational speeds that are within a rotational speed range between a first rotational speed U1 and a second rotational speed U2, while this dependency decreases for rotational speeds higher than U2. The first rotational speed value U1 is in the present example a minimum rotational speed of the generator, which is a rotational speed for which the generator starts to generate current. For current generators that are, for example, used in alternators of vehicles, the rotational speed range [U1, U2], for which there is a strong dependency of the output current on the rotational speed, includes, for example, rotational speeds between $1500\,min^{-1}$ and $300\,min^{-1}$. In a vehicle this is the rotational speed range that usually includes the idle speed of the vehicle's combustion engine.

Control of the rotational speed of a combustion engine is performed by a motor control (not shown) dependent on a loading of the combustion engine. Such loading of the combustion engine of a vehicle is primarily effected by the vehicle gear. Generator 61 additionally to the vehicle gear acts as a load for the combustion engine. In an idle state of the combustion engine, i.e., if no drive torque is to be generated, generator 61 can be the primary load of the combustion engine. A varying power consumption of the generator 61, which may result from a varying power consumption of the electrical load 7 connected to the generator arrangement 6, may possibly result in significant and undesired swings in the idle speed of the combustion engine. If an electrical consumer is switched on so that the output voltage Vout of the generator arrangement 6, or the battery voltage Vbat, respectively, decreases, circuit arrangement 1 via the field current I3 readjusts the power consumption of the generator 61 in order to avoid further decreasing of the battery voltage Vbat or to have the battery voltage Vbat increase to a nominal value, respectively. This increased power consumption of the generator 61 results in an increased loading of the combustion engine, with the rotational speed of the combustion engine via the motor control being increased accordingly. In idle state, if the power output of the combustion engine is low, slight changes in the power consumption of the electrical generator may be sufficient to result in swings of the idle speed of the combustion engine.

The circuit arrangement 1 for controlling the field current is adapted to generate the field current I3 besides output voltage Vout also dependent on a rotational speed of generator 61. The circuit arrangement 1 is, in particular, adapted to compensate for changes, like changes that result from changes in the current consumption of the load, slower for smaller rotational speeds than for higher rotational speeds. For smaller rotational speeds the power consumption of the generator 61 is therefore adapted slower to changing load scenarios than for higher rotational speeds. Thus, the control behavior of circuit arrangement 1 is slower for small rotational speed as compared to higher rotational speed. In this way heavy changes in the power consumption of the generator 61, that may negatively influence controlling the rotational speed of the combustion engine, are for low rotational speeds prevented or at least reduced.

For controlling the field current I3 dependent on the rotational speed of the circuit arrangement 1, referring to FIG. 1, receives a rotational speed signal Su being dependent on the rotational speed or being a measure for the rotational speed, respectively. The rotational speed signal Su may be generated by a rotational speed detection unit 5. Any rotational speed detection unit 5 may be used that is suitable to detect the rotational speed of a current generator. Such rotational speed detection unit 5, for example, includes a frequency counter that receives the voltage of one phase of the generator 61 and that is adapted to determine the frequency of this voltage. This takes advantage of the fact that the voltage of one phase of the generator 61 is a sinusoidal voltage that has a frequency which corresponds to the rotational frequency or rotational speed of the generator 61. Such frequency counters are basically known, so that further explanations are not required.

Detecting the rotational speed by evaluating an electrical signal of the generator 61 is only an example. Generating the rotational speed signal Su is not restricted to this example, but rotational speed signal may be generated in any suitable manner. It is further possible to generate rotational speed signal Su, for example, by using a rotary encoder (shaft encoder) that is arranged at a mechanical shaft (not shown) of generator 61.

Figure 3:
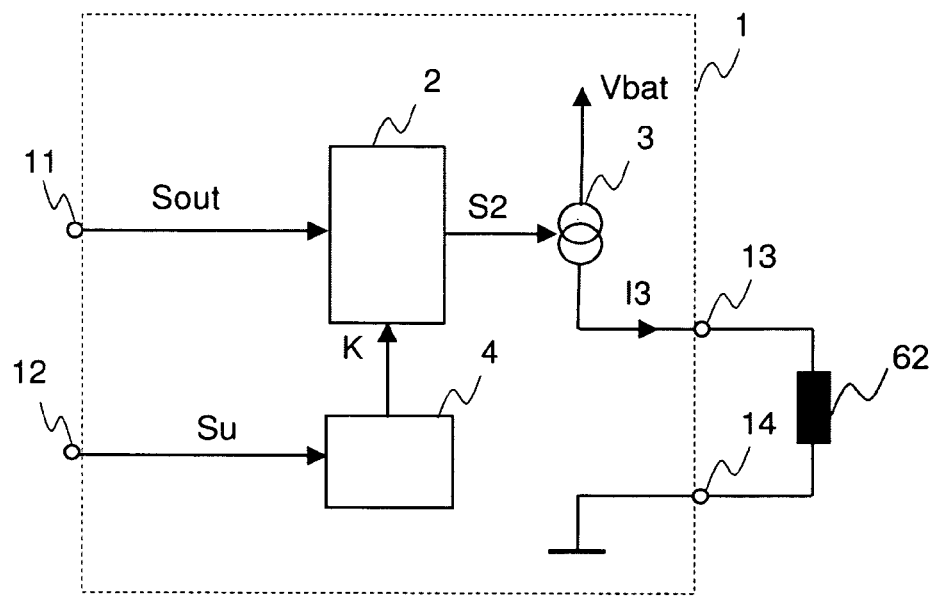
FIG. 3 illustrates an example of a circuit arrangement for controlling the output voltage, the circuit arrangement including a controlled current source, a controller arrangement and a control parameter circuit.

FIG. 3 on the basis of a block diagram illustrates an example of the circuit arrangement 1 for controlling the field current I3. This circuit arrangement 1 includes the first input 11 for receiving the output voltage signal Sout, the second input 12 for receiving the rotational speed signal Su, and an output 13 for providing the field current I3 to the field winding 62, which, for a better understanding, is also illustrated in FIG. 3. The circuit arrangement 1 includes a controller arrangement 2 that receives the output voltage signal Sout and that is adapted to provide a control signal S2 being dependent on the output voltage signal Sout. This control signal S2 is provided to a controllable current source 3 that is adapted to generate field current I3 dependent on the control signal S2.

Controller arrangement 2 is an adaptive controller arrangement, i.e., controller arrangement 2 is a controller arrangement having a control characteristic that is adjustable, where in the present example it is adjustable dependent on the rotational speed signal Su. In the example illustrated controller arrangement 2 generates control signal S2 dependent on the output voltage signal Sout and using at least one control parameter that has reference character K in FIG. 3 and that is dependent on the rotational speed signal Su. For generating the control parameter K the illustrated circuit arrangement includes a control parameter circuit 4 that receives the rotational speed signal Su and that is adapted to generate the at least one control parameter K dependent on the rotational speed signal Su. Control parameter circuit 4, for example, includes a calculation unit that is adapted to calculate the at least one control parameter K dependent on rotational speed signal Su according to an algorithm stored in the calculation unit. In a further example control parameter circuit 4 includes a look-up table in which different control parameter values are stored, these control parameter values being assigned to values or value ranges of the rotational speed signal Su, are read out dependent on the rotational speed signal Su and are provided to the controller arrangement 2.

Dependent on the type of controller arrangement 2, control parameter circuit 4 may generate one or more control parameters dependent on the rotational speed. Reference character K in FIG. 3 is representative for these control parameters.

The circuit arrangement 1 including the controller arrangement 2, the current source 3, as well as the control parameter circuit 4 may be integrated in a single semiconductor chip (not shown). Moreover, it is also possible to integrate only some of these components, like, for example, the controller arrangement 2 and the current source 3, in a semiconductor chip and to arrange the control parameter circuit 4 outside this semiconductor chip.

Figure 4:
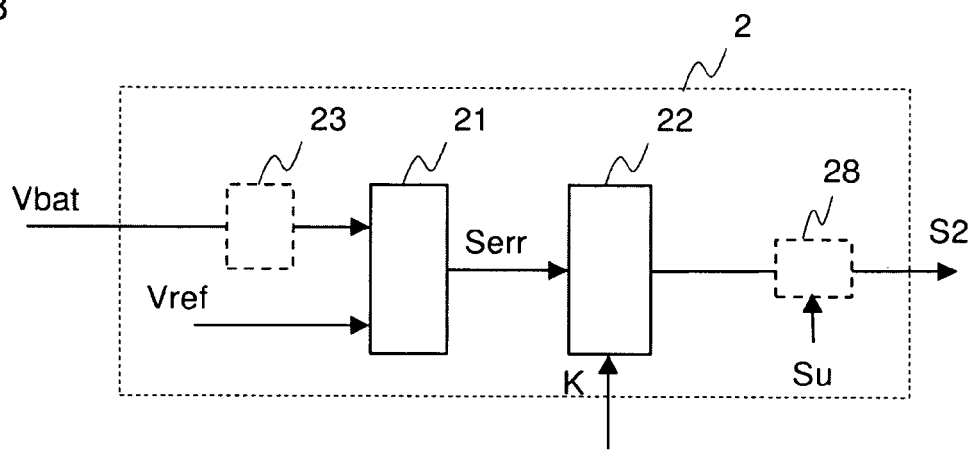
FIG. 4 illustrates an example of the controller arrangement that includes an error signal generation circuit and a controller.

FIG. 4 illustrates an example of the controller arrangement 2. This controller arrangement 2 includes an error signal generation circuit 21 that receives the output voltage signal Sout and a voltage reference signal Vref. Voltage reference signal Sref represents a nominal voltage to which the output voltage Vout of the generator arrangement (6 in FIG. 1) is to be controlled. Error signal generation circuit 21 is adapted to generate from the output voltage signal Sout and the voltage reference signal Sref an error signal Serr that represents a difference (deviation) between the output voltage signal Sout and the voltage reference signal Sref, and that therefore represents a difference (deviation) between the output voltage Vout and the nominal voltage. Error signal generation signal circuit 21 includes, for example, a subtraction unit that generates the error signal Serr, error signal Serr representing the difference between the output voltage signal Sout and the voltage reference signal Sref.

Error signal Serr is provided to a controller 22 that generates the control signal S2 from this error signal Serr. Controller 22 may be any controller, like, for example, a proportional controller (P-Controller), an integral controller (I-Controller) or a proportional-integral-controller (PI-controller). If the error signal generation circuit 21 and the controller 22 are realized using digital circuit components, then the controller arrangement 2 additionally includes an analog-to-digital converter 23, the analog-to-digital converter receiving the output voltage signal Sout and generating from the analog output voltage signal Sout a digital output voltage signal that is provided to the error signal generation circuit 21. Reference voltage signal Sref is generated by a signal source that is not illustrated in detail. In a digital controller arrangement 2 this signal source is, for example, a digital memory in which the voltage reference signal Sref is stored as a numerical value. In an analog controller arrangement 2 this signal source is, for example, a voltage source.

According to one example reference signal Sref is generated dependent on the temperature, and, for example, in such a way that reference signal Sref is reduced with increasing temperature. In this way the generator is protected from overloading with increasing temperature. The reference signal Sref may be reduced continuously or in steps with increasing temperature. In a simple example reference signal Sref has only two different values: a first value for temperatures lower than a given threshold value; and a second value for temperatures higher than the given threshold value.

Controller arrangement 2 optionally includes a limiting circuit 28 that is adapted to limit variations over time (slew rate) of the control signal S2 to a maximum. This limitation is applied for a rising, i.e., increasing control signal, as well for a sinking, i.e., decreasing control signal. Such limitation circuits, which are also known as "slew rate limiter", are generally known, so that further explanations are not required. The limitation circuit 28 is, in particular, adapted to limit time variations of the control signal S2 for such rotational speeds that are below a rotational speed threshold value. This threshold value is, for example, in a range between 2000 $min^{-1}$ and 3000 $min^{-1}$. In this example the limitation circuit is active for rotational speeds below the rotational speed threshold value and therefore limits time variations of the control signal S2 for low rotational speeds, while the control signal S2 passes the limitation circuit 28 for higher rotational speeds without changes.

Figure 5:
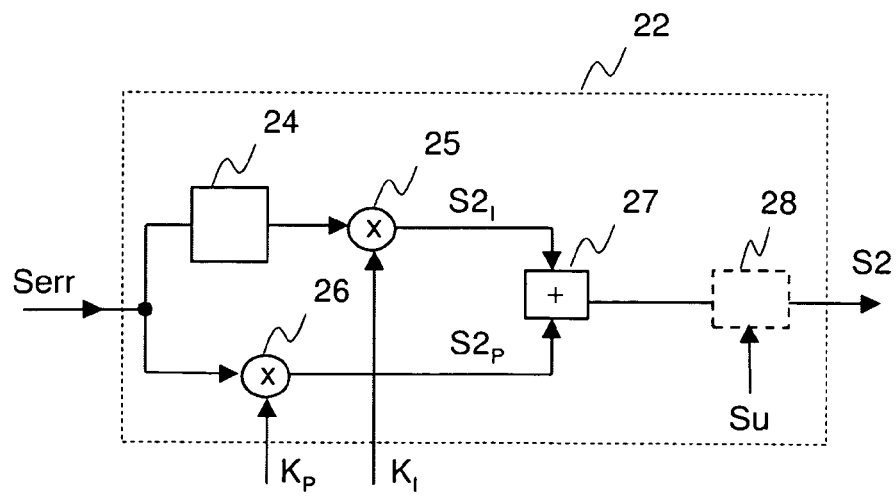
FIG. 5 illustrates an example of the controller.

The functionality of controller 22 will below be explained for a controller that is realized as a PI-Controller. FIG. 5 schematically shows such a PI-Controller, i.e., a controller having a proportional-integral-characteristic, that receives the error signal Serr and that generates control signal S2 from the error signal Serr. The control signal S2 in such a controller includes two signal components: a proportional component $S2_P$ that is obtained by multiplying the error signal Serr with the first control parameter $K_P$; and an integral component $S2_I$ that is obtained by multiplying an integral of the error signal Serr with a second control parameter $K_I$. In FIG. 5 reference character 24 designates an integrator that receives the error signal Serr and that generates an output signal, the output signal representing an integral over time of the error signal (in an analog controller) or the sum of timely successive values of the control signal (in a digital controller). The duration of the time window for integrating or summing may be in the range of up to several seconds.

Reference characters 25 and 26 designate multipliers, namely: a first multiplier 25 that receives the output signal of integrator 24 and the second control parameter $K_I$ and that generates the integral component $S2_I$; and a second multiplier 26 that receives the error signal Serr and the first control parameter $K_P$ and the generates the proportional component $S2_P$. Control signal S2 is provided at an output of an adder 27 that receives the proportional and integral components $S2_P$, $S2_I$ as its input signals.

Figure 6:
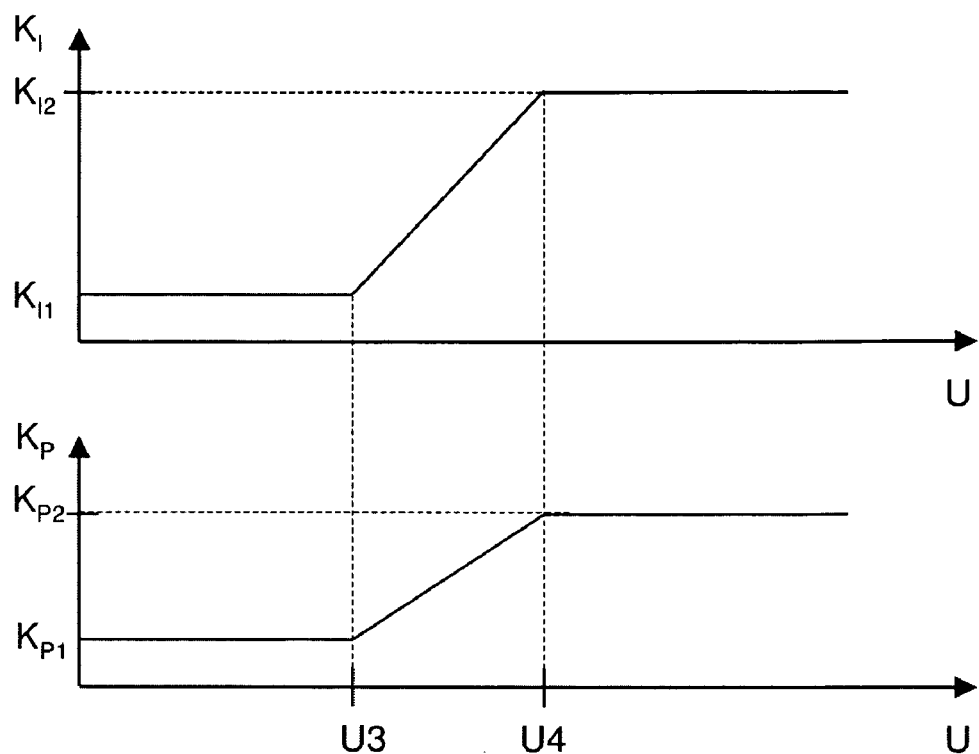
FIG. 6 illustrates an example of the dependency of a first and a second control parameter that are provided to the controller on the rotational speed of the generator.

FIG. 6 illustrates for a first example the dependency of the first and second control parameters $K_P$, $K_I$ on the rotational speed U of the generator (61 in FIG. 1). In this example the two control parameters $K_P$, $K_I$ increase with increasing rotational speed U for rotational speeds that are within a rotational speed range that includes rotational speeds between U3 and U4. In the example illustrated in FIG. 6 the increase in the control parameters is linear dependent on the rotational speed. This linear increase is merely chosen for explanation purposes. Basically, the two control parameters may increase in any manner, which is also not linear, for rotational speeds that are within a given rotational speed range. The rotational speed range, within which the two control parameters $K_P$, $K_I$ increase, is the same for both control parameters $K_P$, $K_I$ in FIG. 6. However, this is only an example. It goes without saying that these rotational speed ranges may be selected differently. Furthermore, one of the control parameters may be constant, while the other of the two control parameters increases with increasing rotational speed for rotational speeds that are within the given rotational speed range. In one example second control parameter $K_I$ that determines the weight of the integral component in the control signal S2, is constant, while the first control parameter $K_P$ varies dependent on the rotational speed U in the way explained before. In FIG. 6, $K_{P1}$, $K_{I1}$ and $K_{P2}$, $K_{I2}$ are minimum or maximum values of the control parameters.

The dependency of the control parameters $K_P$, $K_I$ on the rotational speed U, which has been explained with reference to FIG. 6, results in a slower control characteristic of the controller (22 in FIGS. 4 and 5) for rotational speeds that are smaller than the lower rotational speed value U3 as compared to rotational speeds above the upper rotational speed value U4. This will be explained with reference to an example in the following: assuming the output voltage Vout has a change of ΔVout at a given time and this change of the output voltage Vout results in a change ΔSerr of error signal Serr. This results in an immediate change of the proportional component $S2_P$, and therefore in an immediate change of the control signal S2 for a value ΔS2. For this amendment ΔS2 of the control signal S2 for rotational speeds below the lower rotational speed value applies:

$$\Delta S2 = K_{P1} \cdot \Delta \text{Serr} \tag{1a}$$

and for rotational speeds above the upper rotational speed value U4:

$$\Delta S2 = K_{P2} \cdot \Delta \text{Serr} \tag{1b}$$

Thus, the same change of the output voltage Vout for higher rotational speeds results in a stronger change of the control signal S2 and therefore in a stronger adaptation of the power consumption of the generator. The dependency of the power consumption of the generator on the control signal will be explained in below.

Thus, controller 22 is slower for small rotational speeds than for higher rotational speeds. In this connection it should be noted that equations (1a) and (1b) are based on the simplifying assumption that the integration time constant of the integrator or summer 24 is long enough that a change in the error signal Serr does not immediately influence the integral component.

Figure 7:
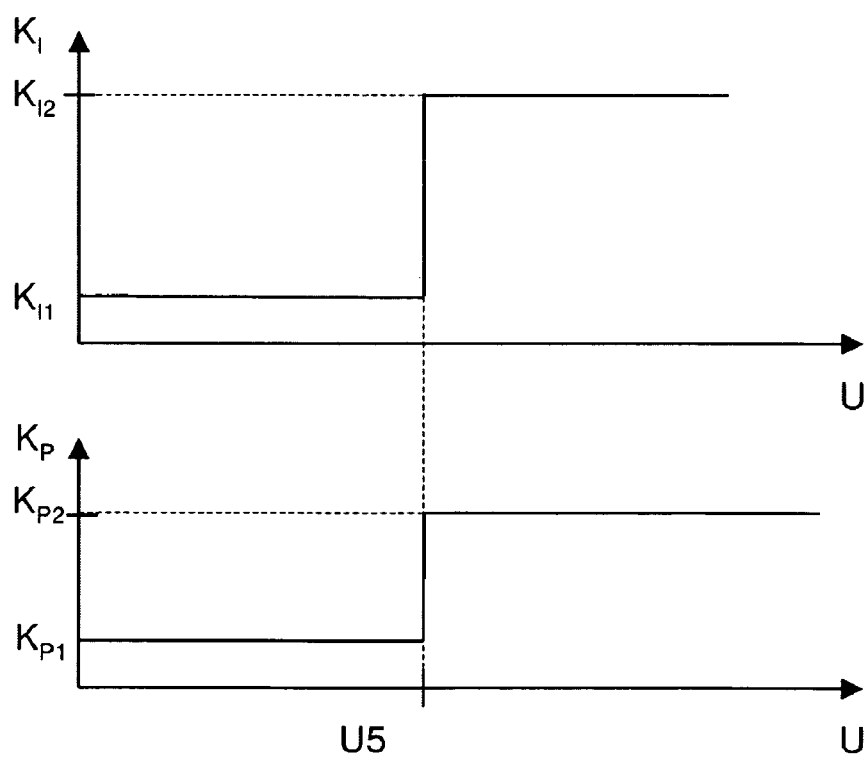
FIG. 7 illustrates a second example for the dependency of the first and second control parameters on the rotational speed.

FIG. 7 illustrates a further example for the dependency of the first and second control parameters $K_P$, $K_I$ on the rotational speed U. In the illustrated example each of these control parameters have only two different values: a first control parameter value $K_{P1}$ and $K_{I1}$, respectively, for rotational speeds below a rotational speed threshold value U5; and a second control parameter value $K_{P2}$ and $K_{I2}$, respectively, for rotational speeds above the rotational speed threshold value U5. In this connection it should be noted that the threshold value, at which the control parameter value changes, may be different for the two control parameters. Further, corresponding to the explanations that have been made with reference to FIG. 6, only one of the two control parameters may be varied, while the other control parameter is constant independent of the rotational speed. It goes without saying that the alternatives that have been explained with reference to FIGS. 6 and 7 may be combined in such a manner that one of the two control parameters has a dependency on the rotational speed as it has been explained with reference to FIG. 6, and that the other one of the two control parameters has a dependency on the rotational speed as it has been explained with reference to FIG. 7.

Figure 8:
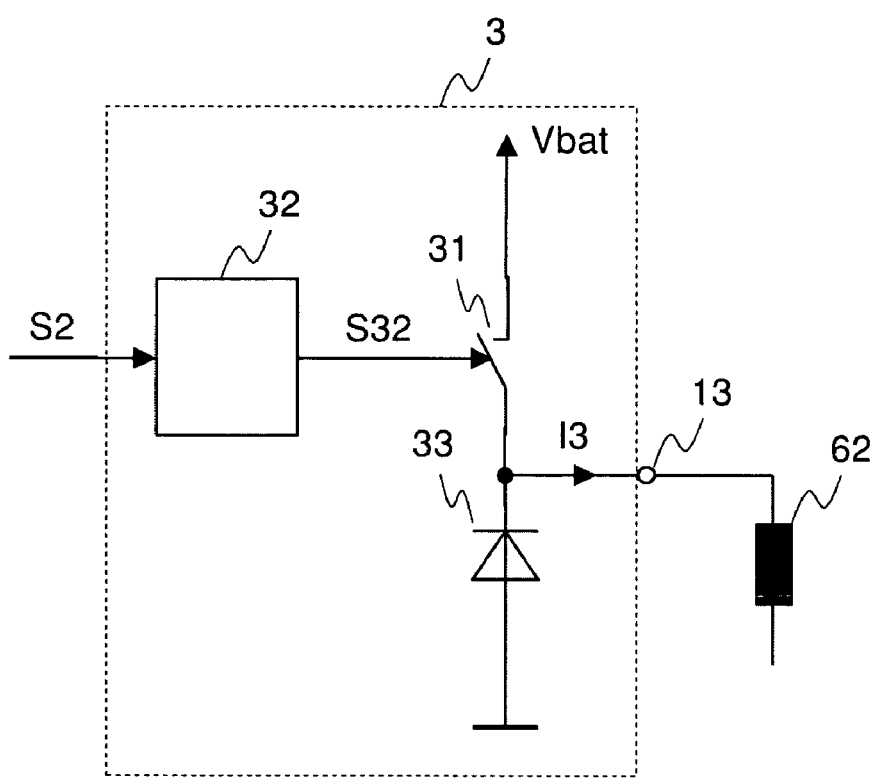
FIG. 8 illustrates an example of the current source.

FIG. 8 illustrates an example of the controlled current source 3, that provides the field current I3 for field winding 62 dependent on the control signal S2. This current source includes a switch 31 that is connected between a terminal for a supply potential, like, for example, battery potential Vbat, and the output 13. This switch 31 is driven in a pulse-width-modulated manner using a pulse-width-modulated signal S32. This pulse-width-modulated signal S32 is provided by a pulse-width-modulator 32 and has a duty cycle that is dependent on the control signal S2. Pulse-width-modulator 32 for generating the pulse-width-modulated signal S32 receives the control signal S2. The current source 3 illustrated in FIG. 8 generates a triangular shaped field current I3, the field current I3 having a mean value that is dependent on the duty cycle of the pulse-width-modulated signal S32, and that is therefore dependent on the control signal S2. For generating this triangular shaped current the current source 3 uses the inductivity of the field winding 62, where according to the clock of the pulse-width-modulated signal S32 supply voltage Vbat is applied to the field winding 62 via switch 31. Current source 3 further includes a freewheeling element 33, like, for example, a diode, that is connected in parallel to the field winding 62 and that conducts a freewheeling current of the field winding 62 each time switch 31 blocks.

Generator 61 is, for example, a generator that for a given rotational speed has an increasing power consumption with increasing field current I3. In this case the controller arrangement and the current source are adapted in such a way so as to increase the duty cycle of the control signal S2 if the output voltage Vout decreases below the nominal voltage or if the output voltage signal Sout decreases below the voltage reference value Sref, respectively.

Finally it should be noted that any of the features disclosed with reference to one example may be combined with any of the features of another example, even if this is not explicitly stated.

What is claimed is:

1. A method for controlling an output voltage of a generator arrangement that comprises a generator having a field winding, the method comprising:
   generating a controlled field current for the field winding dependent on the output voltage and dependent on at least one control parameter that is dependent on a rotational speed of the generator; wherein generating comprises decreasing a rate of change of the controlled field current with respect to an output voltage change if the rotational speed decreases for at least one rotational speed of the generator.

2. The method of claim 1, wherein the field current is generated dependent on a control signal that is dependent on the output voltage and the rotational speed.

3. The method of claim 2, wherein the control signal is generated such that it is dependent on a difference between the output voltage and a voltage reference value.

4. The method of claim 3, wherein the control signal is dependent on the at least one control parameter.

5. The method of claim 4, wherein the at least one control parameter is selected such that, for a given rotational speed range, a change in the control signal for a given change in the output voltage decreases, if the rotational speed decreases.

6. The method of claim 4, wherein the at least one control parameter decreases for a given rotational speed range with decreasing rotational speed.

7. The method of claim 4, wherein the at least one control parameter assumes a first value for rotational speeds that are lower than a rotational speed threshold value, and a second value for rotational speeds that are higher than the rotational speed threshold value.

8. The method of claim 3, wherein the control signal is generated in such a manner that it comprises:

a proportional component that is proportional to a first control parameter and proportional to a difference between the output voltage and the reference value; and an integral component that is proportional to a second control parameter and proportional to an integral of the difference between the output voltage and the voltage reference value.

9. The method of claim 8, wherein at least one of the first and second control parameters is dependent on the rotational speed.

10. The method of claim 2, wherein the field current is generated by applying a pulse-width-modulated voltage to the field winding, the pulse-width-modulated voltage having a duty cycle that is dependent on the control signal.

11. The method of claim 1, further comprising an accumulator coupled to the generator arrangement, the accumulator receiving the output voltage.

12. The method of claim 2, wherein absolute values of time variations of the control signal are limited to a maximum for rotational speed values that are below a further rotational speed threshold value.

13. A circuit arrangement for controlling an output voltage of a generator arrangement, the generator arrangement having a generator with a field winding, the circuit arrangement comprising:
  a first input for receiving an output voltage signal that is dependent on the output voltage;
  a second input for receiving a rotational speed signal that is dependent on a rotational speed of the generator;
  circuitry that is adapted to generate a controlled field current for the field winding, the field current being dependent on the output voltage and being dependent on at least one control parameter that is dependent on the rotational speed of the generator;
  a controller arrangement that receives the output voltage signal and the at least one control parameter and that is adapted to generate a control signal dependent on the output voltage signal and the at least one control parameter;
  a control parameter circuit that receives the rotational speed signal and that generates the at least one control parameter with a value that is dependent on the rotational speed signal; and
  a current source that receives the control signal and that is adapted to generate the controlled field current dependent on the control signal.

14. The circuit arrangement of claim 13, wherein the controller arrangement is adapted to generate the control signal in such a way that it is dependent on a difference between the output voltage signal and a voltage reference value.

15. The circuit arrangement of claim 13, wherein the control parameter circuit is adapted to generate the at least one control parameter in such a way that a change of the control signal for a given change of the output voltage decreases, if the rotational speed decreases.

16. The circuit arrangement of claim 13, wherein the control parameter circuit is adapted, to generate the at least one control parameter in such a way that it decreases with decreasing rotational speed for a given rotational speed range.

17. The circuit arrangement of claim 13, wherein the control parameter circuit is adapted to generate the at least one control parameter in such a way that it assumes a first value for rotational speeds smaller than a rotational speed reference value, and a second value for rotational speeds higher than a rotational speed reference value.

18. The circuit arrangement of claim 13, wherein the controller arrangement is adapted to generate the control signal in such a way that the control signal comprises:
  a proportional component that is proportional to a first control parameter and proportional to a difference between the output voltage and a reference value; and
  an integral component that is proportional to a second control parameter and proportional to an integral of the difference between the output voltage and a reference value.

19. The circuit arrangement of claim 18, wherein at least one of the first and second control parameters is dependent on the rotational speed.

20. The circuit arrangement of claim 13, wherein the current source comprises:
  a pulse-width-modulator that receives the control signal and that is adapted to generate a pulse width modulated drive signal having a duty cycle dependent on the control signal; and
  a switch that is connectable in series to the field winding and that receives a drive signal.

21. A voltage supply arrangement, comprising:
  a generator arrangement having a generator that comprises a field winding, and output terminals for providing an output voltage;
  a rotational speed detection unit that is adapted to detect a rotational speed of the generator and to generate a rotational speed signal being dependent on the rotational speed; and
  a circuit arrangement for generating a field current for the field winding, the circuit arrangement receiving an output voltage signal that is dependent on the output voltage and the rotational speed signal and that is adapted to generate a controlled field current for the field winding, the field current being dependent on the output voltage and being dependent on at least one control parameter that is dependent on the rotational speed of the generator, wherein, for at least one rotational speed of the generator, the circuit arrangement decreases a rate of change of the controlled field current with respect to an output voltage change if the rotational speed decreases.

22. The voltage supply arrangement of claim 21, further comprising an accumulator connected to the generator arrangement.

23. A method for controlling an output voltage of a generator arrangement that comprises a generator having a field winding, the method comprising:
  generating a controlled field current for the field winding dependent on the output voltage and dependent on at least one control parameter that is dependent on a rotational speed of the generator, wherein
  the field current is generated dependent on a control signal that is dependent on the output voltage and the rotational speed, and
  absolute values of time variations of the control signal are limited to a maximum for rotational speed values that are below a further rotational speed threshold value.

* * * * *